United States Patent
Hock

[11] Patent Number: 5,958,587
[45] Date of Patent: Sep. 28, 1999

[54] METHOD OF REMOVING BLEMISHES IN COMPRESSION MOLDED ARTICLES

[75] Inventor: Mark Ronald Hock, Toledo, Ohio

[73] Assignee: Owens-Illinois Closure Inc., Toledo, Ohio

[21] Appl. No.: 08/845,114

[22] Filed: Apr. 21, 1997

[51] Int. Cl.⁶ .................. B32B 5/16; B27N 3/18; B65B 7/28
[52] U.S. Cl. ............... 428/402; 428/328; 428/357; 264/45.3; 264/118; 264/319; 215/200
[58] Field of Search ................ 428/402, 172, 428/164, 156, 192, 328, 357; 264/15, 176.1, 45.3, 109, 118, 319; 215/200

[56] References Cited

U.S. PATENT DOCUMENTS

| | | |
|---|---|---|
| 4,882,225 | 11/1989 | Fukui et al. .................. 428/405 |
| 4,923,325 | 5/1990 | Howie ........................... 403/361 |
| 4,959,189 | 9/1990 | Rohrbacher et al. ............ 264/510 |
| 5,001,000 | 3/1991 | Rohrbacher et al. ............ 428/215 |
| 5,169,707 | 12/1992 | Faykish et al. ................ 428/195 |
| 5,268,789 | 12/1993 | Bradshaw ....................... 359/534 |
| 5,328,650 | 7/1994 | Ingram et al. ................. 264/45.3 |
| 5,397,610 | 3/1995 | Odajima et al. ................ 428/35.7 |
| 5,468,540 | 11/1995 | Lu .............................. 428/156 |

Primary Examiner—Donald Loney

[57] ABSTRACT

A method of compression molding a closure having a base wall and peripheral skirt with internal threads, a thermoplastic resin blended with metallic particles wherein the particles are added in elliptical or spherical form. The metallic particles are provided in a carrier of resin which is then blended with the resin of the closure and the melt blend is extruded through a nozzle and cut into individual pellets. Each pellet is deposited into the cavity of a mold which is then closed to compression mold a closure.

18 Claims, No Drawings

METHOD OF REMOVING BLEMISHES IN COMPRESSION MOLDED ARTICLES

This invention relates to compression molding plastic articles such as closures wherein the resin includes metallic flakes.

BACKGROUND AND SUMMARY OF THE INVENTION

Conventional melt delivery system used for compression molding articles such as closures comprises mixing a resin along with metered quantities of colorant and additives and feeding them into the resin hopper, and subsequently extruding the resin. At the exit to the extruder, the melt is metered by a melt pump, providing a controlled volume of extrudate out of the melt pump. If the molds to which the charges of resin are in a remote position, the extrudate passes through a hose or conduit to a nozzle. As the extrudate emerges from the nozzle, it is cut by a rotating blade into individual charges and deposited into successive mold cavities as they are conveyed beneath the cutter blade.

Such a process has previously been unsuccessful in the molding resin containing metallic pigment additives due to the formation of an aesthetically objectionable pellet blemish on the surface of the article. For example, when the article is a closure having a base wall and a peripheral skirt, with threads on a surface thereof, such a blemish is readily noticed on the base wall.

It was found that the above described delivery system causes the metallic flakes in the pigment to align in the direction of flow through the hose and nozzle such that they are parallel with the axis of the cylindrical shaped pellet at it exists the nozzle. During the cut off of the pellet, this alignment remains largely undistributed, such that at the juncture of the cylindrical sides of the pellet and the circular ends of the pellet, there is an abrupt change in alignment of the metallic flakes. It was found that this change in alignment is a major contributor of the pellet blemish effect, whereby the pellet is deposited in the cool cavity in a fairly random way, and the flake alignment becomes "frozen in" as the "skin" solidifies during forming against the cool cavity.

The material flow action during compression molding differs from that of injection molding. In compression molding, the pellet is placed in contact with the surface of the open mold and remains in this initial position for the period of time required to close the mold. Only during the final stages of the closing of the mold does the pellet begin to be deformed and to be displaced to fill the mold. At this time, the material within the pellet is flowing, whereas the initial contact or "skin" area of pellet remains essentially in its original position. This differs from injection molding where the material flows in from a central gate of small diameter, and immediately flows radially outward into a fully closed mold. This flow in injection molding results in alignment of the flakes as the melt is forced through the thin sections of the closed mold immediately. Alignment of the flakes parallel to the closure wall results in a good metallic appearance.

In U.S. Pat. No. 5,328,650, there is disclosed a method of removing the blemishes which comprises adding a blowing agent to the resin prior to extrusion, controlling the temperature of said melt such that the blowing agent is activated just prior to extrusion of the melt from the nozzle, the amount of blowing agent being sufficient to randomized the particle pigment additive such that gaseous bubbles are formed in the extruded melt in an amount sufficient to substantially reduce blemishes normally occurring in compression molding of resins containing particle pigment additive and in an amount not so great that the gaseous bubbles will not be substantially expelled from the melt during the compression molding to form the closure.

Among the objectives of the present invention is to provide a method of avoiding the blemishes in compression molded closures without the use of blowing agents or control of temperature of the resin.

In accordance with the invention, the particles added for pearlescence comprise spherical or ellipsoidal particles, such as aluminum particles, instead of flat pearlescent particles. The resultant compression molded closures have no discernable blemishes. Preferably the spherical or ellipsoidal particles are provided in a plastic carrier compatible with the resin of which the closure is made and formed into pellets which are then mixed with the resin to be extruded. A preferred resin comprises polypropylene for the closure and the carrier. When the molten blend of the resin and carrier resin with the ellipsoidal or spherical particles is extruded, cut off into pellets and compression molded in a cavity to form a closure, the resultant closure does not have any discernable blemishes.

DESCRIPTION OF THE PREFERRED EMBODIMENTS

This invention relates to compression molding of plastic closures wherein a resin along with metered quantities of colorant and additives and feeding them into the resin hopper, and subsequently extruding the resin. At the exit to the extruder, the melt is metered by a melt pump, providing a controlled volume of extrudate out of the melt pump. If the molds to which the charges of resin are in a remote position, the extrudate passes through a hose or conduit to a nozzle. As the extrudate emerges from the nozzle, it is cut by a rotating blade into individual charges and deposited into successive mold cavities as they are conveyed beneath the cutter blade. Each charge is compression molded to produce an article such as a closure having a base wall and a peripheral skirt having internal threads.

In accordance with the invention, the particles added for pearlescence comprise spherical or ellipsoidal particles, such as aluminum particles, instead of flat pearlescent particles. The resultant compression molded closures have no discernable blemishes. Preferably, the spherical or ellipsoidal particles are provided in a plastic carrier compatible with the resin of which the closure is made and formed into pellets which are then mixed with the resin to be extruded. A preferred resin comprises polypropylene for the closure and the carrier. When the molten blend of the resin and carrier resin with the ellipsoidal or spherical particles is extruded, cut off into pellets and compression molded in a cavity to form a closure, the resultant closure does not have any discernable blemishes.

A preferred particle comprises metallic flakes and a plasticizer coating over the particles. Typical plasticizers comprise dioctyl phthalate, diisodecyl phthalate or mineral oil. In one example, the particles have the following properties:

Maximum retained 325 mesh 1.0%
Diameter 19 microns
Dioctyl phthalate plasticizer 20%
Such particles comprises SILVEX® 221-20-A made by Silberline Manufacturing Co., Inc., Tamaqua, Pa.

The amount of particles utilized comprises about 0.5% to about 3% by weight of the molded closure. Satisfactory results have been achieved where the particles comprise about 0.75% by weight of the molded closure.

It can thus be seen that there has been provided a method of avoiding blemishes in compression molded closures containing metallic particles without the use of blowing agents or controlling the temperature of the resin.

What is claimed is:

1. In a method of compression molding a plastic closure having a base wall and a peripheral skirt with internal threads, in which a thermoplastic resin is blended with metallic particles, the melt blend is extruded through a nozzle, cut into individual pellets, each pellet is deposited into the cavity of a mold which is then closed to compression mold a closure, the improvement wherein said step of adding particles comprises adding metallic particles in ellipsoidal or spherical form.

2. The method set forth in claim 1 wherein said particles are provided in a plastic carrier which is blended with said thermoplastic resin.

3. The method set forth in claim 2 wherein said particles comprise aluminum particles.

4. The method set forth in claim 2 wherein said particles are coated with a plasticizer before being blended with said carrier.

5. The method set forth in claim 4 wherein a plasticizer is selected from the group comprising dioctyl phthalate, diisodecyl phthalate and mineral oil.

6. The method set forth in claim 4 wherein a plasticizer comprises dioctyl phthalate.

7. The method set forth in claim 1 wherein the amount of particles comprises about 0.75% by weight of the plastic closure.

8. The method set forth in claim 7 wherein the thermoplastic resin of said closure and said carrier comprises polypropylene.

9. The method set forth in any one of claims 1–8 wherein the amount of particles comprises about 0.5% to about 3% by weight of said plastic closure.

10. A compression molded plastic closure comprising a base wall and a peripheral skirt with internal threads, said closure having a plurality of metallic particles in ellipsoidal or spherical form distributed therein.

11. The compression molded closure set forth in claim 10 wherein said particles are provided in a plastic carrier which is blended with said thermoplastic resin.

12. The compression molded closure forth in claim 11 wherein said particles comprise aluminum particles.

13. The compression molded closure set forth in claim 12 wherein said particles are coated with a plasticizer before being blended with said carrier.

14. The compression molded closure set forth in claim 13 wherein a plasticizer is selected from the group comprising dioctyl phthalate, diisodecyl phthalate and mineral oil.

15. The compression molded closure set forth in claim 13 wherein a plasticizer comprises dioctyl phthalate.

16. The compression molded closure set forth in claim 15 wherein the amount of particles comprises about 0.75% by weight of the plastic closure.

17. The compression molded closure set forth in claim 16 wherein the thermoplastic resin of said closure and said carrier comprises polypropylene.

18. The compression molded closure set forth in any one of claims 10–17 wherein the amount of particles comprises about 0.5% to about 3% by weight of said plastic closure.

\* \* \* \* \*